(12) United States Patent
Adams et al.

(10) Patent No.: US 9,251,246 B2
(45) Date of Patent: *Feb. 2, 2016

(54) CONFORMED DIMENSIONAL AND CONTEXT-BASED DATA GRAVITY WELLS

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,468

(22) Filed: Jan. 28, 2015

(65) Prior Publication Data

US 2015/0149470 A1   May 28, 2015

Related U.S. Application Data

(63) Continuation of application No. 13/733,052, filed on Jan. 2, 2013, now Pat. No. 8,983,981.

(51) Int. Cl.
    *G06F 17/30* (2006.01)
(52) U.S. Cl.
    CPC .... *G06F 17/30598* (2013.01); *G06F 17/30303* (2013.01)
(58) Field of Classification Search
    USPC ........................................................ 707/755
    See application file for complete search history.

(56) References Cited

U.S. PATENT DOCUMENTS

| 5,450,535 A | 9/1995 | North |
| 5,664,179 A | 9/1997 | Tucker |

(Continued)

FOREIGN PATENT DOCUMENTS

| EP | 1566752 A2 | 8/2005 |
| EP | 1843259 A2 | 10/2007 |

(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(Continued)

*Primary Examiner* — Tony Mahmoudi
*Assistant Examiner* — Michael Le
(74) *Attorney, Agent, or Firm* — John R. Pivnichny; Law Office of Jim Boice

(57) ABSTRACT

A processor-implemented method, system, and/or computer program product defines multiple context-based conformed dimensional data gravity wells on a context-based conformed dimensional data gravity wells membrane. Conformed dimensional objects and synthetic context-based objects are parsed into n-tuples. A virtual mass of each parsed object is calculated, in order to define a shape of the multiple context-based conformed dimensional data gravity wells that are created when data objects that are pulled into each of the context-based conformed dimensional data gravity well frameworks on a context-based conformed dimensional gravity wells membrane.

19 Claims, 9 Drawing Sheets

(56) References Cited

U.S. PATENT DOCUMENTS

| | | |
|---|---|---|
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |
| 6,167,405 A | 12/2000 | Rosensteel et al. |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,353,818 B1 | 3/2002 | Carino, Jr. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 * | 1/2006 | Burt |
| 7,019,740 B2 | 3/2006 | Georgalas |
| 7,047,253 B1 | 5/2006 | Murthy et al. |
| 7,058,628 B1 | 6/2006 | Page |
| 7,103,836 B1 | 9/2006 | Nakamura et al. |
| 7,152,070 B1 | 12/2006 | Musick et al. |
| 7,191,183 B1 | 3/2007 | Goldstein |
| 7,209,923 B1 * | 4/2007 | Cooper |
| 7,337,174 B1 | 2/2008 | Craig |
| 7,441,264 B2 | 10/2008 | Himmel et al. |
| 7,493,253 B1 | 2/2009 | Ceusters et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,620,958 B1 | 12/2013 | Adams et al. |
| 8,799,323 B2 | 8/2014 | Nevin, III |
| 8,849,907 B1 | 9/2014 | Hession et al. |
| 8,914,413 B2 | 12/2014 | Adams et al. |
| 2001/0051881 A1 | 12/2001 | Filler |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212664 A1 | 11/2003 | Breining et al. |
| 2003/0212851 A1 | 11/2003 | Drescher et al. |
| 2003/0217052 A1 * | 11/2003 | Rubenczyk ....... G06F 17/30643 |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0188088 A1 | 8/2005 | Fellenstein et al. |
| 2005/0222890 A1 | 10/2005 | Cheng et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0174840 A1 | 7/2007 | Sharma et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0131293 A1 | 5/2010 | Linthicum et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |

(56) References Cited

U.S. PATENT DOCUMENTS

| | | |
|---|---|---|
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173292 A1 | 7/2013 | Friedlander et al. |
| 2013/0173585 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291098 A1 | 10/2013 | Chung et al. |
| 2013/0326412 A1 | 12/2013 | Treiser |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0184500 A1 | 7/2014 | Adams et al. |
| 2014/0188960 A1 | 7/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

Evaggelio Pitoura et al., "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Visual Paradigm, "DB Visual Architect 4.0 Designer's Guide: Chapter 6—Mapping Object Model to Data Model and Vice Versa", 2007, pp. 6-2-6-26.

U.S. Appl. No. 13/609,710—Non-Final Office Action Mailed Jan. 27, 2014.

U.S. Appl. No. 13/540,295—Non-Final Office Action Mailed Jan. 30, 2014.

U.S. Appl. No. 13/540,230—Non-Final Office Action Mailed Jan. 30, 2014.

U.S. Appl. No. 13/540,267—Non-Final Office Action Mailed Feb. 4, 2014.

U.S. Appl. No. 13/628,853—Notice of Allowance Mailed Mar. 4, 2014.

U.S. Appl. No. 13/595,356—Non-Final Office Action Mailed Apr. 14, 2014.

"Ninth New Collegiate Dictionary", Merriam-Webster Inc., 1991, p. 77 and 242.

"The American Heritage College Dictionary", Fourth Edition, Houghton Mifflin Company, 2004, p. 44 and 262.

U.S. Appl. No. 13/680,832—Non-Final Office Action Mailed Apr. 8, 2014.

U.S. Appl. No. 13/592,905—Notice of Allowance Mailed Oct. 25, 2013.

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

M.J. Flynn, et al., "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.

P. Kanerva, "What We Mean We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

(56) References Cited

OTHER PUBLICATIONS

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

W. Caid et al., "Context Vector-Based Text Retrieval", Fair Isaac Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

J. Cheng et al., "Context-Aware Object Connection Discovery in Large Graphs", Data Engineering, 2009. ICDE '09. IEEE 25th International Conferen.

R. Angles et al., "Survey of Graph Database Models", ACM Computing Surveys, vol. 40, No. 1, Article 1, Feb. 2008, pp. 1-65.

U.S. Appl. No. 13/592,905—Non-Final Office Action Mailed May 8, 2013.

U.S. Appl. No. 13/628,853—Non-Final Office Action Mailed Nov. 7, 2013.

U.S. Appl. No. 13/342,406—Notice of Allowance Mailed Mar. 20, 2014.

U.S. Appl. No. 13/755,623—Notice of Allowance Mailed May 27, 2014.

S. Alam et al., "Interoperability of Security-Enabled Internet of Things", Springer, Wireless Personal Communications, Dec. 2011, vol. 61, pp. 567-586.

U.S. Appl. No. 13/648,801—Non-Final Office Action Mailed Jul. 1, 2014.

U.S. Appl. No. 13/609,710—Final Office Action Mailed Jul. 24, 2014.

U.S. Appl. No. 13/861,058—Non-Final Office Action mailed Dec. 11, 2014.

U.S. Appl. No. 13/733,052—Non-Final Office Action mailed Sep. 18, 2014.

U.S. Appl. No. 13/755,987—Non-Final Office Action mailed Jan. 2, 2015.

U.S. Appl. No. 13/648,801—Final Office Action mailed Jan. 13, 2015.

G. Begelman et al., "Automated Tag Clustering: Improving Search and Exploration in the TagSpace", Collaborative Tagging Workshop, WWW2006, Edinburgh, Scotland, May 2006, pp. 1-29.

U.S. Appl. No. 13/621,931—Non-Final Office Action mailed Jan. 28, 2015.

U.S. Appl. No. 13/732,567—Non-Final Office Action mailed Jan. 30, 2015.

U.S. Appl. No. 14/078,135—Notice of Allowance mailed Feb. 24, 2015.

U.S. Appl. No. 13/756,051—Notice of Allowance mailed Feb. 27, 2015.

U.S. Appl. No. 13/732,567—Non-Final Office Action mailed Mar. 26, 2015.

L. Du et al., "A Unified Object-Oriented Toolkit for Discrete Contextual Computer Vision", IEEE, IEEE Colloquium on Pattern Recognition, Feb. 1997, pp. 311-315. (Abstract Only).

S. Ceri et al., "Model-Driven Development of Context-Aware Web Applications", ACM, ACM Transactions on Internet Technology, 2007, (Abstract Only).

U.S. Appl. No. 13/610,523—Non-Final Office Action mailed Apr. 30, 2015.

U.S. Appl. No. 13/540,267—Non-Final Office Action mailed Jun. 4, 2015.

U.S. Appl. No. 13/609,710—Examiner's Answer mailed Jun. 9, 2015.

U.S. Appl. No. 13/780,779—Non-Final Office Action mailed Apr. 3, 2015.

U.S. Appl. No. 13/896,461—Non-Final Office Action mailed Apr. 21, 2015.

U.S. Appl. No. 13/569,366—Non-Final Office Action mailed Jun. 30, 2015.

U.S. Appl. No. 13/648,801—Examiner's Answer Mailed Oct. 1, 2015.

* cited by examiner

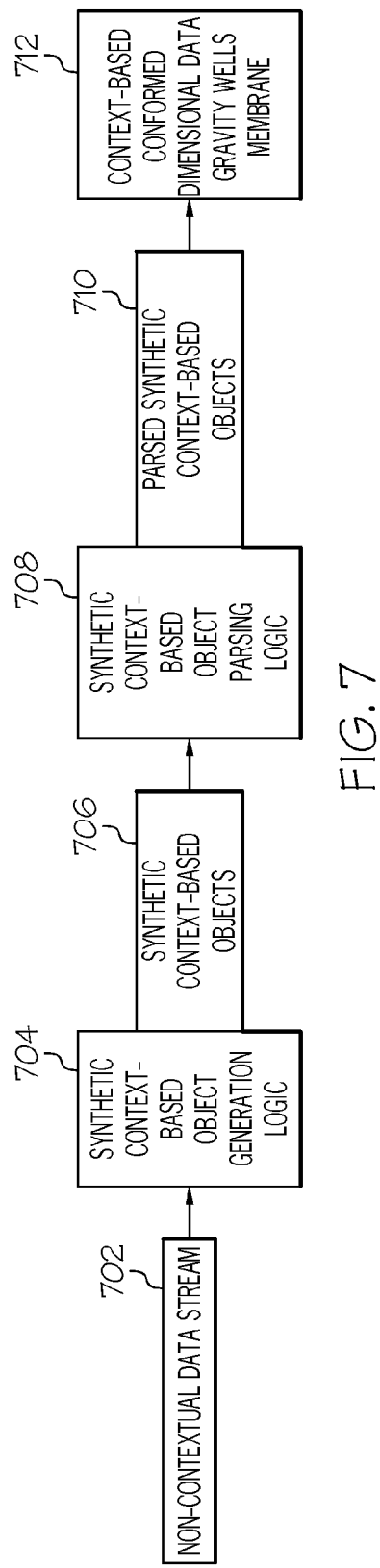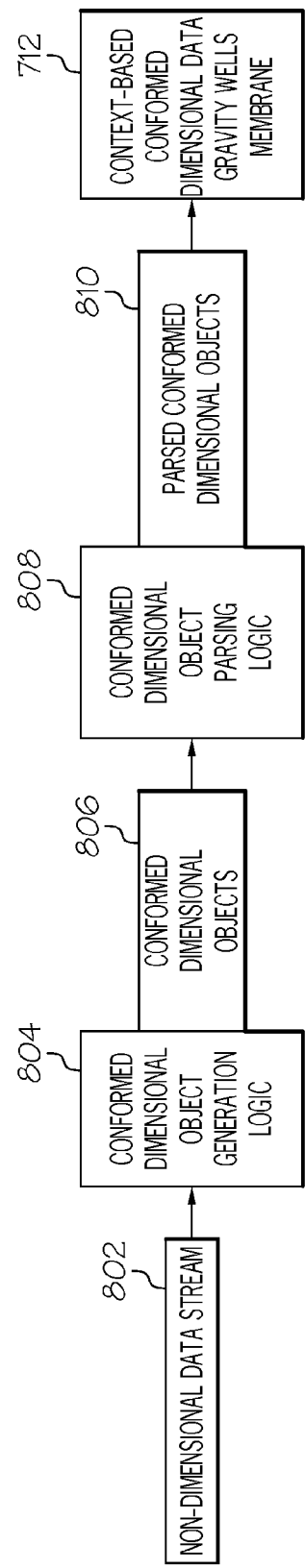
FIG. 7
FIG. 8

CONFORMED DIMENSIONAL AND CONTEXT-BASED DATA GRAVITY WELLS

BACKGROUND

The present disclosure relates to the field of computers, and specifically to the use of computers in managing data. Still more particularly, the present disclosure relates to sorting and categorizing data.

Data are values of variables, which typically belong to a set of items. Examples of data include numbers and characters, which may describe a quantity or quality of a subject. Other data can be processed to generate a picture or other depiction of the subject. Data management is the development and execution of architectures, policies, practices and procedures that manage the data lifecycle needs of an enterprise. Examples of data management include storing data in a manner that allows for efficient future data retrieval of the stored data.

SUMMARY

A processor-implemented method, system, and/or computer program product defines multiple context-based conformed dimensional data gravity wells on a context-based conformed dimensional data gravity wells membrane. Conformed dimensional objects and synthetic context-based objects are parsed into n-tuples. A virtual mass of each parsed object is calculated, in order to define a shape of the multiple context-based conformed dimensional data gravity wells that are created when data objects that are pulled into each of the context-based conformed dimensional data gravity well frameworks on a context-based conformed dimensional gravity wells membrane.

BRIEF DESCRIPTION OF THE SEVERAL VIEWS OF THE DRAWINGS

FIGS. 7-8 illustrate a process of preparing a data stream for transmission to a context-based conformed dimensional data gravity wells membrane;

DETAILED DESCRIPTION

Figure 1:
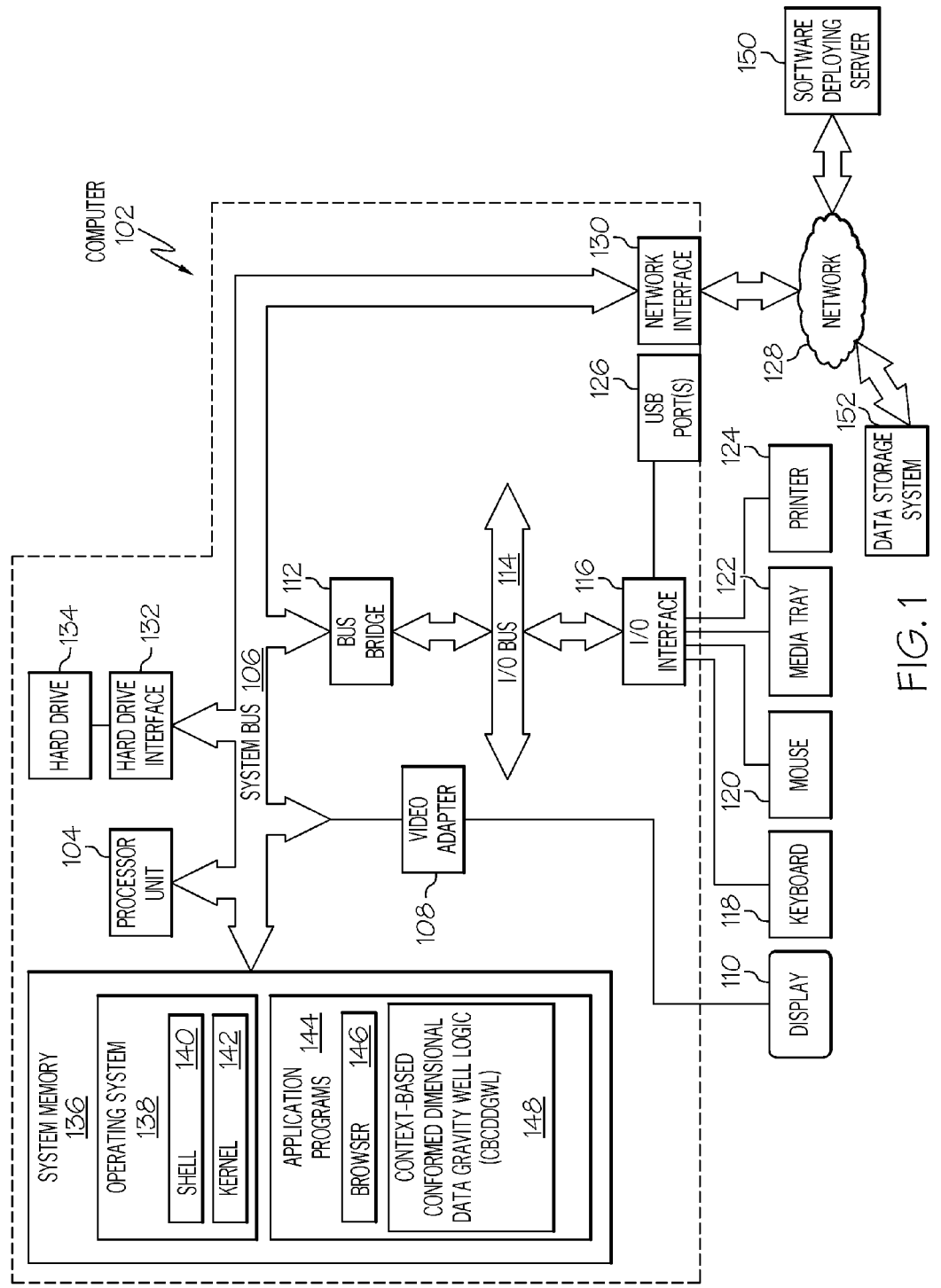
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Figure 9:
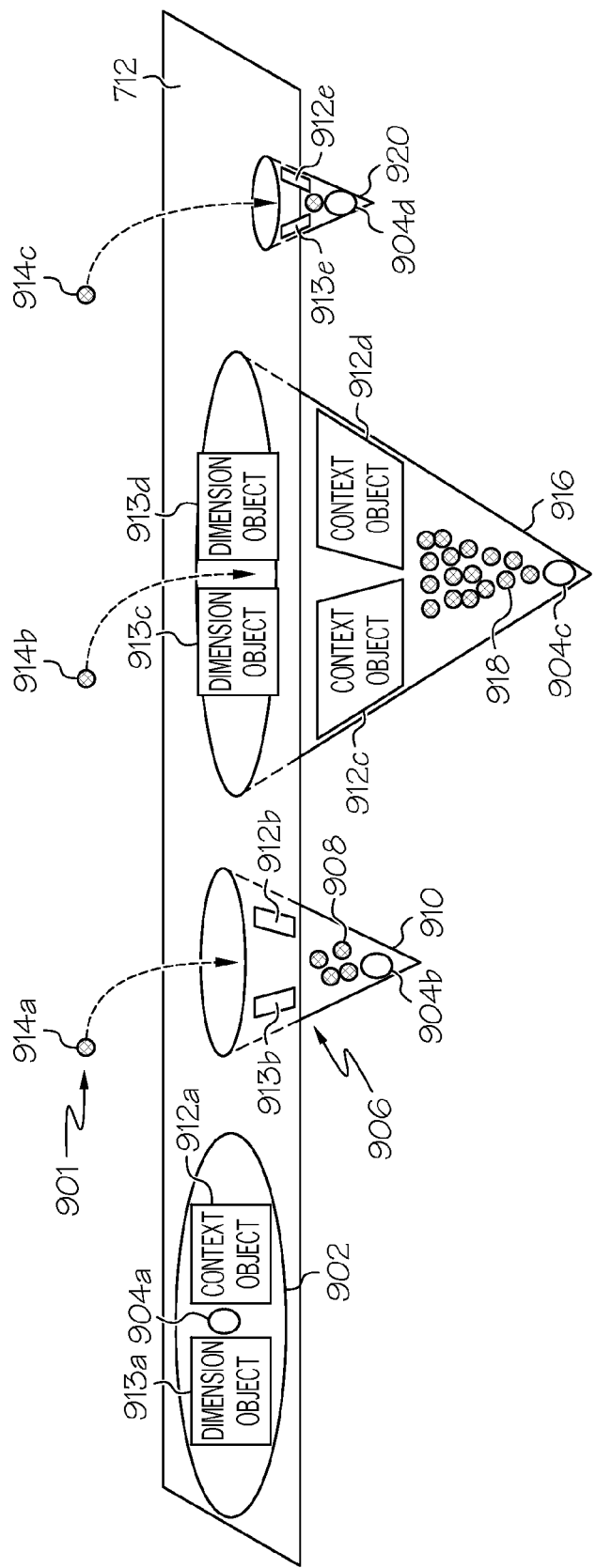
FIG. 9 depicts parsed synthetic context-based and parsed conformed dimensional objects being selectively pulled into context-based conformed dimensional data gravity well frameworks in order to define context-based conformed dimensional data gravity wells.

Application programs 144 in computer 102's system memory (as well as software deploying server 150's system memory) also include a context-based conformed dimensional data gravity well logic (CBCDDGWL) 148. CBCDDGWL 148 includes code for implementing the processes described below, including those described in FIGS. 2-10, and/or for creating the data gravity wells, membranes, etc. that are depicted in FIGS. 7-9. In one embodiment, computer 102 is able to download CBCDDGWL 148 from software deploying server 150, including in an on-demand basis, wherein the code in CBCDDGWL 148 is not downloaded until needed for execution. Note further that, in one embodiment of the present invention, software deploying server 150 performs all of the functions associated with the present invention (including execution of CBCDDGWL 148), thus freeing computer 102 from having to use its own internal computing resources to execute CBCDDGWL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
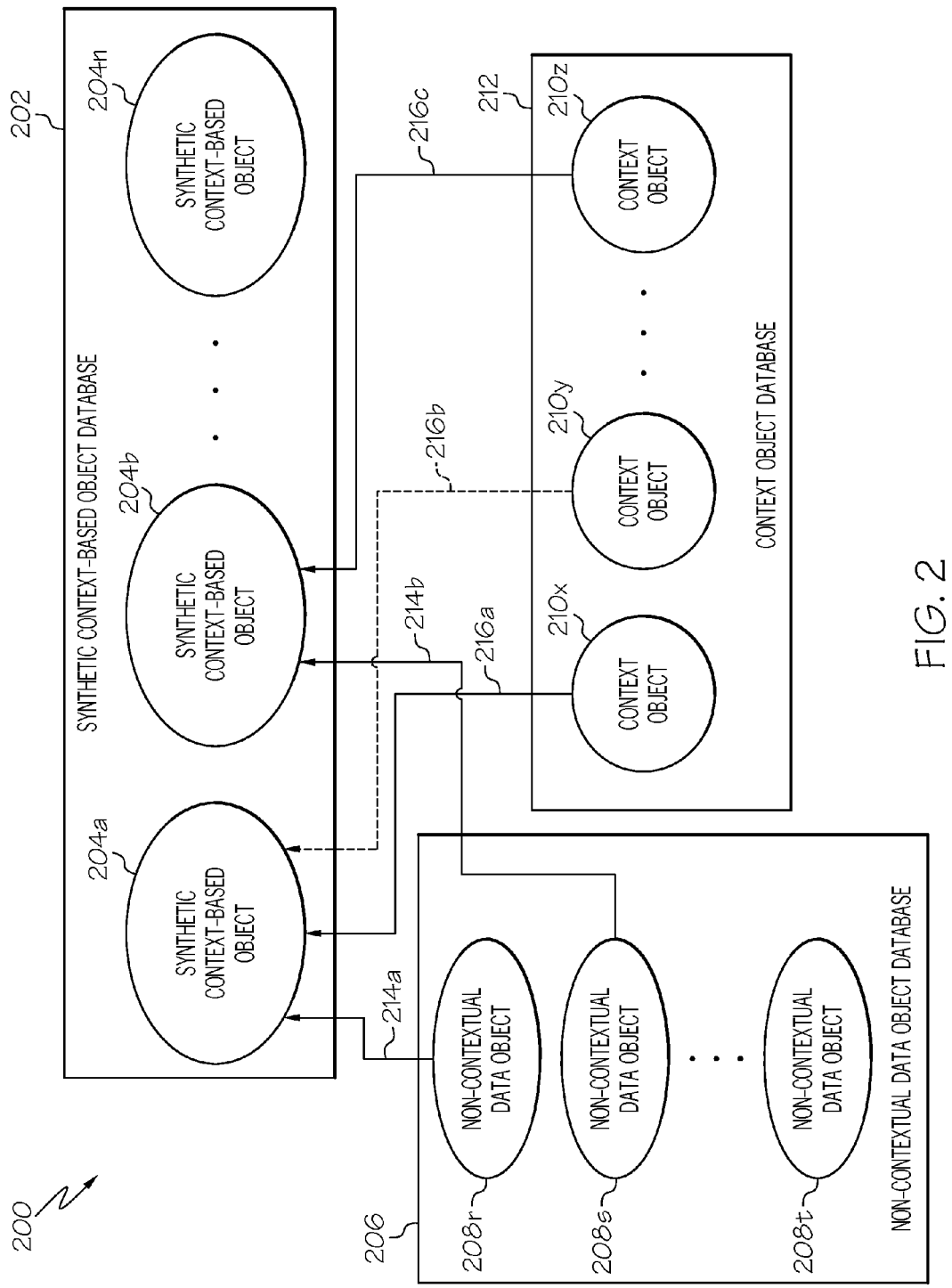
FIG. 2 illustrates a process for generating one or more synthetic context-based objects.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
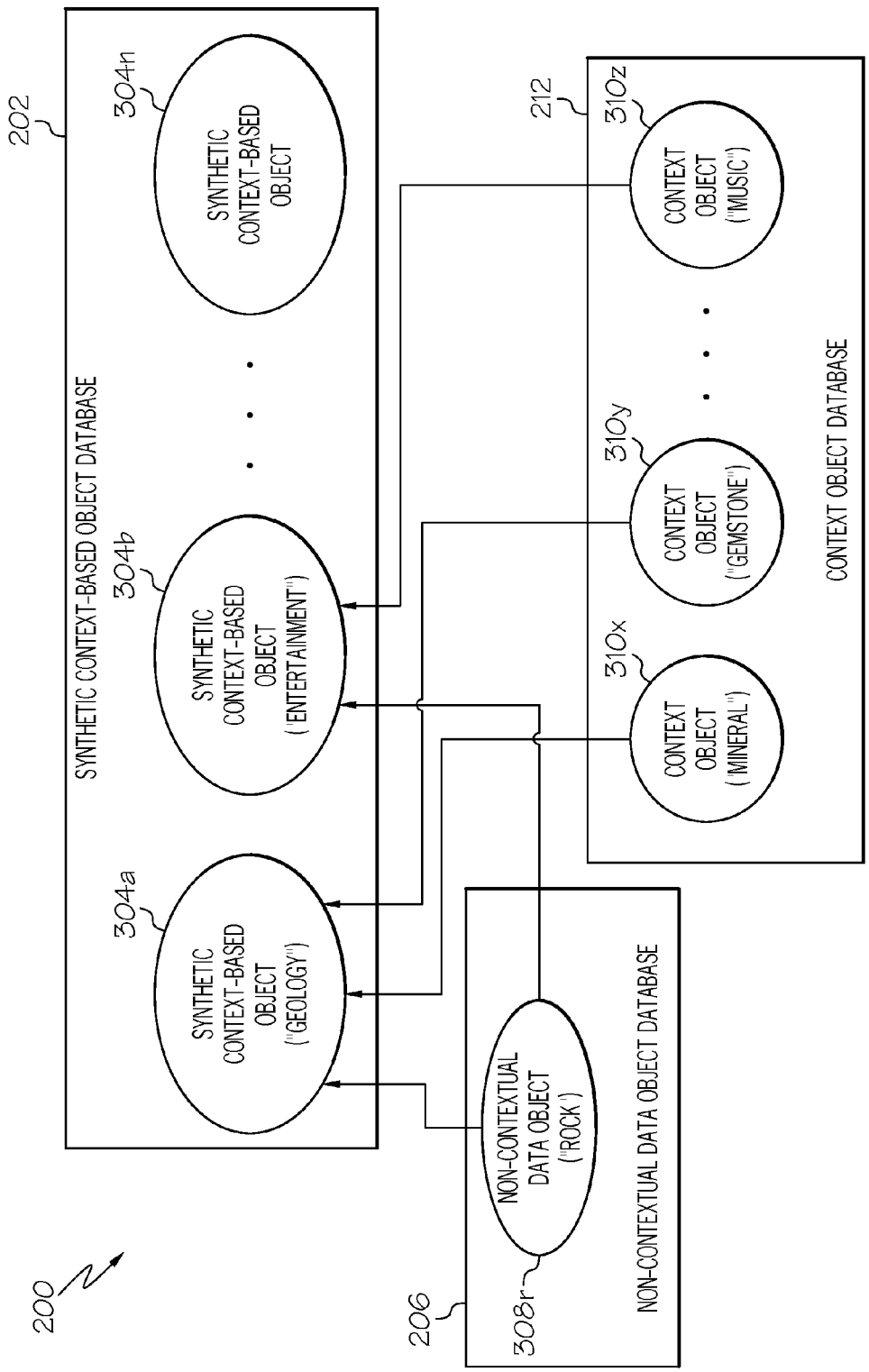
FIG. 3 depicts an exemplary case in which synthetic context-based objects are defined for the non-contextual data object datum "Rock"

Consider now an exemplary case depicted in FIG. 3, in which synthetic context-based objects are defined for the non-contextual datum object "rock". Standing alone, without any context, the word "rock" is meaningless, since it is ambiguous and does not provide a reference to any particular subject-matter. That is, "rock" may refer to a stone, or it may be slang for a gemstone such as a diamond, or it may refer to a genre of music, or it may refer to physical oscillation, etc. Thus, each of these references is within the context of a different subject-matter (e.g., geology, entertainment, physics, etc.).

In the example shown in FIG. 3, then, data (i.e., the word "rock") from the non-contextual data object 308r is associated with (e.g., stored in or associated by a look-up table, etc.) a synthetic context-based object 304a, which is devoted to the subject-matter "geology". The data/word "rock" from non-contextual data object 308r is also associated with a synthetic context-based object 304b, which is devoted to the subject-matter "entertainment". In order to give contextual meaning to the word "rock" (i.e., define the term "rock") in the context of "geology", context object 310x, which contains the context datum "mineral", is associated with (e.g., stored in or associated by a look-up table, etc.) the synthetic context-based object 304a. In one embodiment, more than one context datum can be associated with a single synthetic context-based object. Thus, in the example shown in FIG. 3, the context object 310y, which contains the datum "gemstone", is also associated with the synthetic context-based object 304a.

Associated with the synthetic context-based object 304b is a context object 310z, which provides the context/datum of "music" to the term "rock" provided by the non-contextual data object 308r. Thus, the synthetic context-based object 304a defines "rock" as that which is related to the subject-matter "geology", including minerals and/or gemstones, while synthetic context-based object 304b defines "rock" as that which is related to the subject-matter "entertainment", including music.

In one embodiment, the data within a non-contextual data object is even more meaningless if it is merely a combination of numbers and/or letters. For example, consider the data "104-106" contained within a non-contextual data object 408r depicted in FIG. 4. Standing alone, without any context, these numbers are meaningless, identify no particular subject-matter, and thus are completely ambiguous. That is, "104-106" may relate to subject-matter such as a medical condition, a physics value, a person's age, a quantity of currency, a person's identification number, etc. That is, the data "104-106" is so vague/meaningless that the data does not even identify the units that the term describes, much less the context of these units.

Figure 4:
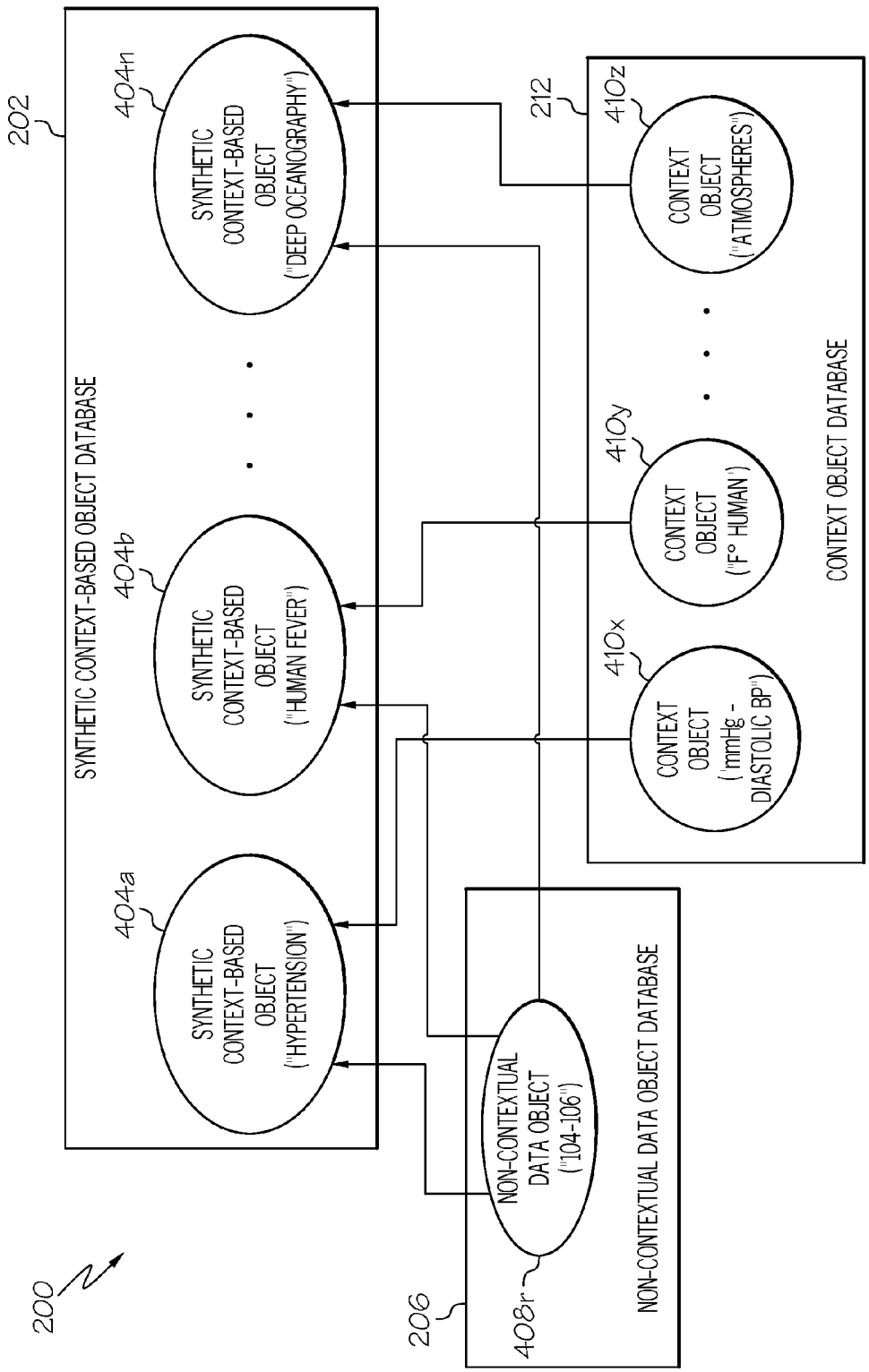
FIG. 4 illustrates an exemplary case in which synthetic context-based objects are defined for the non-contextual data object data "104-106"
Figure 5:
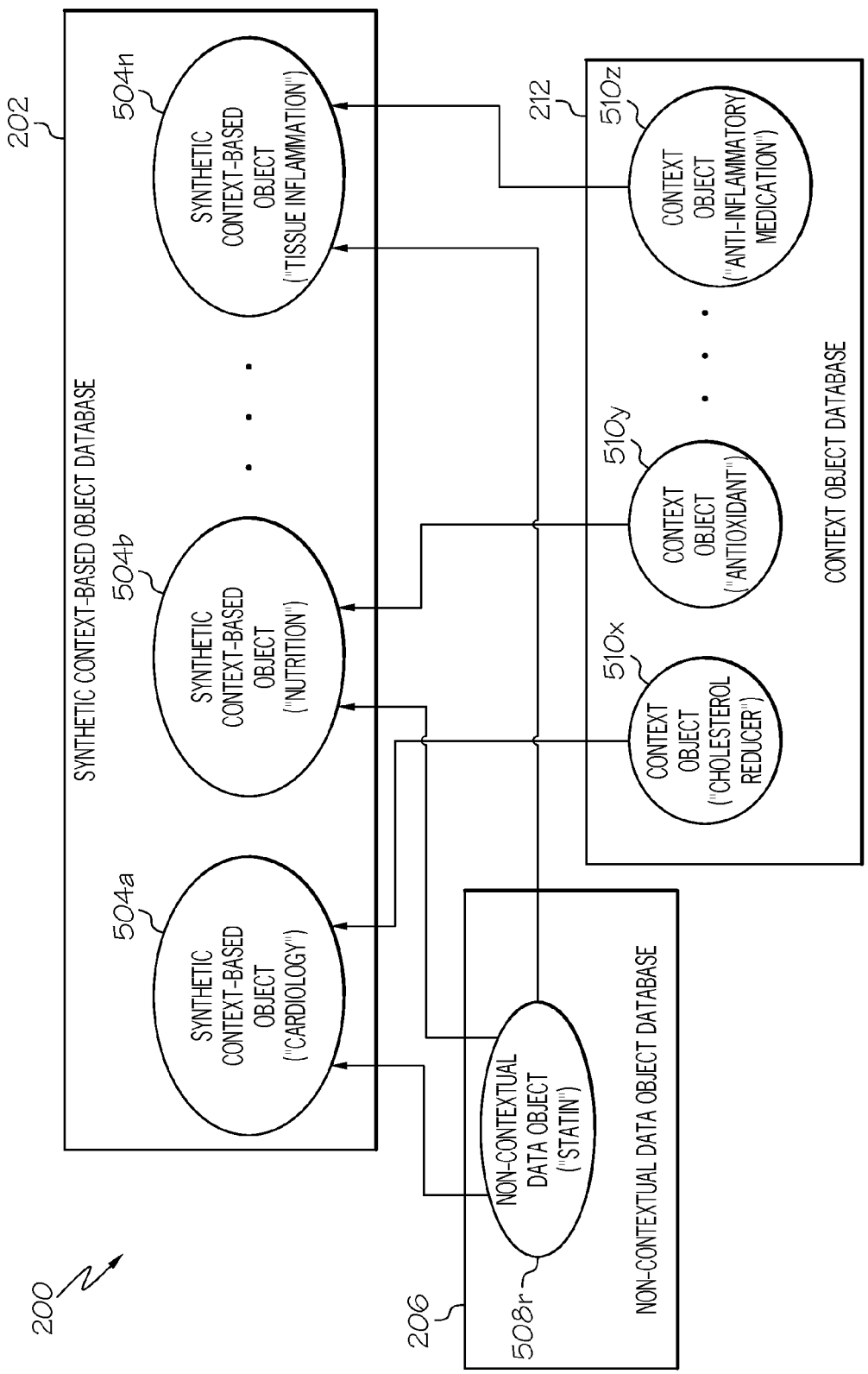
FIG. 5 depicts an exemplary case in which synthetic context-based objects are defined for the non-contextual data object datum "Statin"

In the example shown in FIG. 4, then, data (i.e., the term/values "104-106") from the non-contextual data object 408r is associated with (e.g., stored in or associated by a look-up table, etc.) a synthetic context-based object 404a, which is devoted to the subject-matter "hypertension". The term/values "104-106" from non-contextual data object 408r is also associated with a synthetic context-based object 404b, which is devoted to the subject-matter "human fever" and a synthetic context-based object 404n, which is devoted to the subject-matter "deep oceanography". In order to give contextual meaning to the term/values "104-106" (i.e., define the term/values "104-106") in the context of "hypertension", context object 410x, which contains the context data "millimeters of mercury" and "diastolic blood pressure" is associated with (e.g., stored in or associated by a look-up table, etc.) the synthetic context-based object 404a. Thus, multiple context data can provide not only the scale/units (millimeters of mercury) context of the values "104-106", but the data can also provide the context data "diastolic blood pressure" needed to identify the subject-matter (hypertension) of the synthetic context-based object 404a.

Associated with the synthetic context-based object 404b is a context object 410y, which provides the context data of "degrees on the Fahrenheit scale" and "human" to the term/values "104-106" provided by the non-contextual data object 408r. Thus, the synthetic context-based object 404b now defines term/values "104-106" as that which is related to the subject matter of "human fever". Similarly, associated with the synthetic context-based object 404n is a context object 410z, which provides the context data of "atmospheres" to the term/values "104-106" provided by the non-contextual data object 408r. In this case, the generator of the synthetic context-based object database 202 determines that high numbers of atmospheres are used to define deep ocean pressures. Thus, the synthetic context-based object 404n now defines term/values "104-106" as that which is related to the subject matter of "deep oceanography".

In one embodiment, the non-contextual data object may provide enough self-context to identify what the datum is, but not what it means and/or is used for. For example, consider the datum "statin" contained within the non-contextual data object 508r shown in FIG. 5. In the example shown in FIG. 5, datum (i.e., the term "statin") from the non-contextual data object 508r is associated with (e.g., stored in or associated by a look-up table, etc.) a synthetic context-based object 504a, which is devoted to the subject-matter "cardiology". The term "statin" from non-contextual data object 508r is also associated with a synthetic context-based object 504b, which is devoted to the subject-matter "nutrition" and a synthetic context-based object 504n, which is devoted to the subject-matter "tissue inflammation". In order to give contextual meaning to the term "statin" (i.e., define the term "statin") in the context of "cardiology", context object 510x, which contains the context data "cholesterol reducer" is associated with (e.g., stored in or associated by a look-up table, etc.) the synthetic context-based object 504a. Thus, the datum "cholesterol reducer" from context object 510x provides the context to understand that "statin" is used in the context of the subject-matter "cardiology".

Associated with the synthetic context-based object 504b is a context object 510y, which provides the context/datum of "antioxidant" to the term "statin" provided by the non-contextual data object 508r. That is, a statin has properties both as a cholesterol reducer as well as an antioxidant. Thus, a statin can be considered in the context of reducing cholesterol (i.e., as described by the subject-matter of synthetic context-based object 504a), or it may be considered in the context of being an antioxidant (i.e., as related to the subject-matter of synthetic context-based object 504b). Similarly, a statin can also be an anti-inflammatory medicine. Thus, associated with the synthetic context-based object 504n is the context object 510z, which provides the context data of "anti-inflammatory medication" to the term "statin" provided by the non-contextual data object 508r. This combination identifies the subject-matter of the synthetic context-based object 504n as "tissue inflammation".

Figure 6:
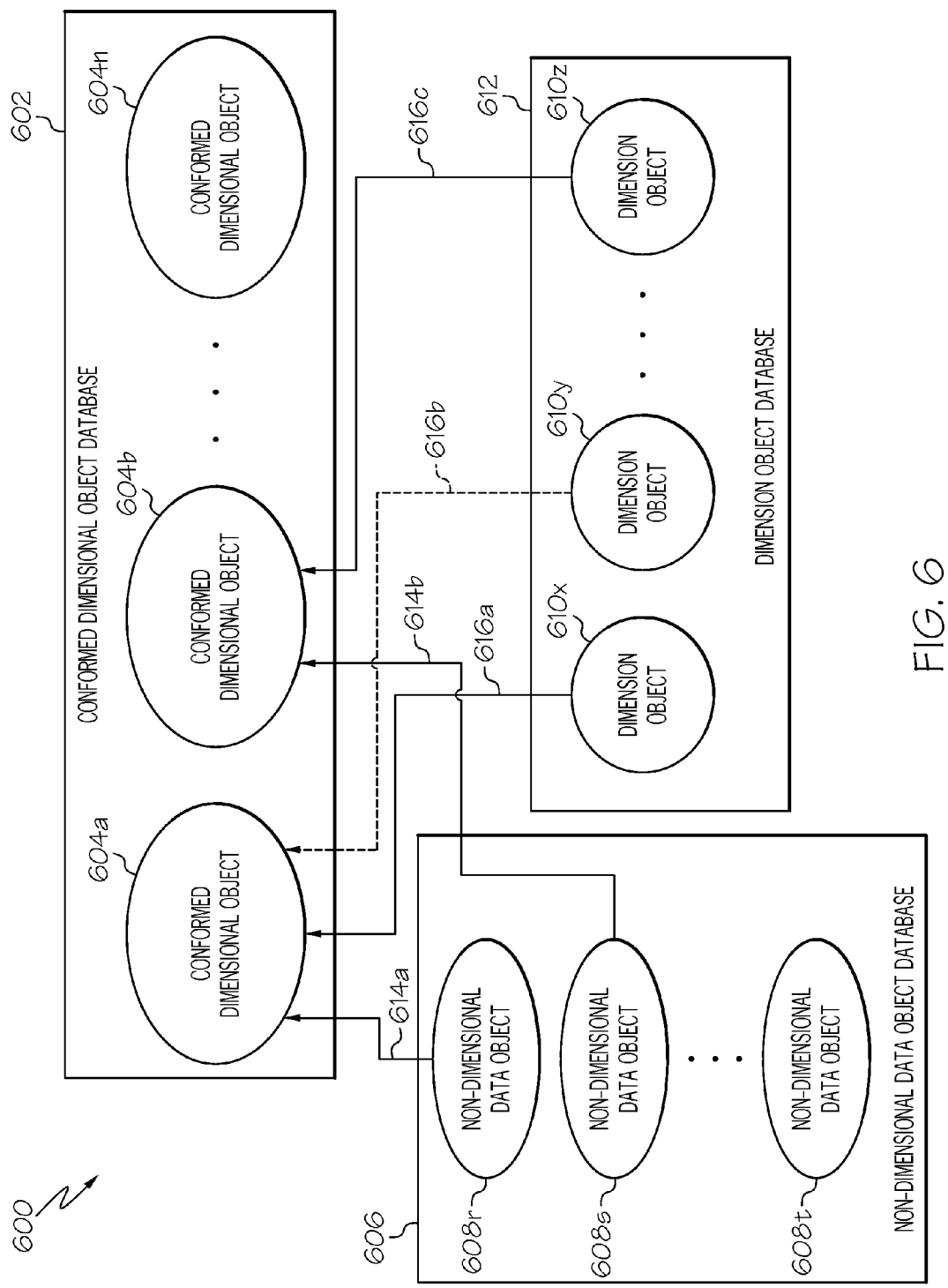
FIG. 6 illustrates a process for generating one or more conformed dimensional objects.

With reference now to FIG. 6, a process for generating one or more conformed dimensional objects in a system 600 is presented. Note that system 600 is a processing and storage logic found in computer 102 and/or data storage system 152 shown in FIG. 1, which process, support, and/or contain the databases, pointers, and objects depicted in FIG. 6.

Within system 600 is a conformed dimensional object database 602, which contains multiple conformed dimensional objects 604a-604n (thus indicating an "n" quantity of objects, where "n" is an integer). Each of the conformed dimensional objects 604a-604n is defined by at least one non-dimensional data object and at least one dimension object. That is, at least one non-dimensional data object is associated with at least one dimension object to define one or more of the conformed dimensional objects 604a-604n. The non-dimensional data object is merely a value/number, and has no dimensions (e.g., meters, product units, kilograms, etc.).

For example, assume that a non-dimensional data object database 606 includes multiple non-dimensional data objects 608r-608t (thus indicating a "t" quantity of objects, where "t" is an integer). However, data within each of these non-dimensional data objects 608r-608t by itself is meaningless, since it has no dimensions. That is, the data within each of the non-dimensional data objects 608r-608t is data that, standing alone, has no meaning, since it could be describing a number of inches, a number of feet, a number of meters, etc. (i.e., it is dimensional-less). In order to give the data within each of the non-dimensional data objects 608r-608t dimensional meaning, they are given dimension, which is provided by data contained within one or more of the dimension objects 610x-610z (thus indicating a "z" quantity of objects, where "z" is an integer) stored within a dimension object database 612. For example, if a pointer 614a points the non-dimensional data object 608r to the conformed dimensional object 604a, while a pointer 616a points the dimension object 610x to the conformed dimensional object 604a, thus associating the non-dimensional data object 608r and the dimension object 610x with the conformed dimensional object 604a (e.g., storing or otherwise associating the data within the non-dimensional data object 608r and the dimension object 610x in the conformed dimensional object 604a), the data within the non-dimensional data object 608r now has been given a label/dimension. This dimensional label/meaning is thus stored within (or otherwise associated with) the conformed dimensional object 604a.

Similarly, if a pointer 614b associates data within the non-dimensional data object 608s with the conformed dimensional object 604b, while the pointer 616c associates data within the dimension object 610z with the conformed dimensional object 604b, then the data within the non-dimensional data object 608s is now given a dimension/label by the data in the dimension object 610z. This dimensional meaning is thus stored within (or otherwise associated with) the conformed dimensional object 604b.

Note that more than one dimension object can give meaning to a particular non-dimensional data object. For example, both dimension object 610x and dimension object 610y can point to the conformed dimensional object 604a, thus providing compound dimensional meaning to the non-dimensional data object 608r shown in FIG. 6. This compound dimensional meaning provides various layers of dimension (e.g., weight and source; store location and price; etc.) to the data in the non-dimensional data object 608r.

Note also that while the pointers 614a-614b and 616a-616c are logically shown pointing toward one or more of the conformed dimensional objects 604a-604n, in one embodiment the conformed dimensional objects 604a-604n actually point to the non-dimensional data objects 608r-608t and the dimension objects 610x-610z. That is, in one embodiment the conformed dimensional objects 604a-604n locate the non-dimensional data objects 608r-608t and the dimension objects 610x-610z through the use of the pointers 614a-614b and 616a-616c.

With reference now to FIG. 7, a process of preparing a non-contextual data stream for transmission to a context-based conformed dimensional data gravity wells membrane is presented. A non-contextual data stream 702 is initially received. For example, assume that an enterprise is tracking sales at a particular store. In this example, the non-contextual data stream 702 may be real-time data that describes what products are being sold, their price, their profit margin, the store location, etc. In one embodiment, however, the non-contextual data stream 702 only includes "raw" data, which has no contextual meaning. In order to give this raw data contextual meaning, the raw data (i.e., non-contextual data objects) are associated with one or more context objects, as described above in FIG. 2-FIG. 5, through the use of a synthetic context-based object generation logic 704 (i.e., part of CBCDDGWL 148 depicted in FIG. 1). Synthetic context-based object generation logic 704 thus converts the non-contextual data stream 702 into synthetic context-based objects 706 (e.g., the synthetic context-based objects 204a-n located in synthetic context-based object database 202 in FIG. 2).

In order to properly utilize the synthetic context-based objects 706, a synthetic context-based object parsing logic 708 parses the synthetic context-based objects 706 into parsed synthetic context-based objects 710. These parsed synthetic context-based objects 710 make up an n-tuple (i.e., an ordered list of "n" descriptive elements (where "n" is an integer)) that describe each of the synthetic context-based objects 706. In one embodiment, this n-tuple includes a pointer (e.g., a locating pathway) to the non-contextual data object in the synthetic context-based object. This pointer may be to a storage location (e.g., a universal resource locator (URL) address at which the non-contextual data object is stored), such that the synthetic context-based objects 706 must be generated, or the pointer may be local (such that the synthetic context-based objects 706 exist locally as part of a streaming data packet, etc.). In one embodiment, the n-tuple also includes a probability value that a non-contextual data object has been associated with a correct context object. That is, a correct context object may or may not be associated with a particular non-contextual data object. For example, the non-contextual data object may be incomplete (i.e., a fragment, a corrupted version, etc.) version of the actual non-contextual data. As such, a "guess" must be made to determine which context data should be associated with that corrupted non-contextual data. In this example, assume that the corrupted non-contextual data object contains the value "3.13", and that the data is related to areas of circles. If the value of the non-contextual data object had been "3.14159", then there is a high probability (e.g., is predetermined to have a 99% probability) that the context of this data object is the ratio of a circle's area divided by that circle's radius-squared (i.e., is "pi"). However, a predetermination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the synthetic context-based object. In one embodiment, this weighting factor is how "important" this particular synthetic context-based object is to an enterprise's project. For example, assume that an enterprise project is to track sales of a particular product at a particular store. If the synthetic context-based object contains information regarding an average sale price of units of a particular product sold at this particular store during a particular time period, then this synthetic context-based object is given (either manually or by an algorithm) an "importance" rating of 95 out of 100. However, if the synthetic context-based object describes whether the items are "red" or "blue" in color, such information is deemed less important (e.g., is given an "importance" rating of 30 out of 100). Note that an algorithm to determine (and/or predetermine) these importance ratings can utilize flags, metadata, etc. to determine the importance of the synthetic context-based objects. For example, assume that a particular synthetic context-based object has a flag indicating that it describes an average price for products sold at a particular store on a particular day. Assume further that a software program for an enterprise project to track such products also has this flag. Thus, if the two flags match, then a high level of importance (e.g., over 95 on a scale of 100) is assigned to synthetic context-based objects that have this flag.

The parsed synthetic context-based objects 710 are then sent to a context-based conformed dimensional data gravity wells membrane 712. The context-based conformed dimensional data gravity wells membrane 712 is a virtual mathematical membrane that is capable of supporting multiple context-based conformed dimensional data gravity wells. That is, the context-based conformed dimensional data gravity wells membrane 712 is a mathematical framework that is part of a program such as CBCDDGWL 148 shown in FIG. 1. This mathematical framework is able to 1) provide a virtual environment in which the multiple context-based data gravity wells exist; 2) populate the multiple context-based conformed dimensional data gravity wells with appropriate synthetic context-based objects (e.g., those synthetic context-based objects having non-contextual data objects and context objects that match those found in the structure of a particular context-based conformed dimensional data gravity well); and 3) support the visualization/display of the context-based conformed dimensional data gravity wells on a display.

With reference now to FIG. 8, a process of preparing a non-dimensional data stream for transmission to a context-based conformed dimensional data gravity wells membrane is presented. A non-dimensional data stream 802 is initially received. For example, assume again that an enterprise is tracking sales at a particular store. As with the non-contextual data stream 702 described above, the non-dimensional data stream 802 is real-time data that describes what products are being sold, their price, their profit margin, the store location, etc. In this feature, however, the non-dimensional data stream 802 includes "raw" data that has no dimensional meaning. In order to give this raw data dimensional meaning, the raw data (i.e., non-dimensional data objects) are associated with one or more dimension objects, as described above in FIG. 6, through the use of a conformed dimensional object generation logic 804 (i.e., part of CBCDDGWL 148 depicted in FIG. 1). Conformed dimensional object generation logic 804 thus converts the non-dimensional data stream 802 into conformed dimensional objects 806 (e.g., the conformed dimensional objects 604a-n located in conformed dimensional object database 602 in FIG. 6).

In order to properly utilize the conformed dimensional objects 806, a conformed dimensional object parsing logic 808 parses the conformed dimensional objects 806 into parsed conformed dimensional objects 810. These parsed conformed dimensional objects 810 make up an n-tuple (i.e., an ordered list of "n" descriptive elements (where "n" is an integer)) that describe each of the conformed dimensional objects 806. In one embodiment, this n-tuple includes a pointer (e.g., a locating pathway) to the non-dimensional data object in the conformed dimensional object. This pointer may be to a storage location (e.g., a universal resource locator (URL) address at which the non-dimensional data object is stored), such that the conformed dimensional objects 806 must be generated, or the pointer may be local (such that the conformed dimensional objects 806 exist locally as part of a streaming data packet, etc.). In one embodiment, the n-tuple also includes a probability value that a non-dimensional data object has been associated with a correct dimension object. That is, a correct dimension object may or may not be associated with a particular non-dimensional data object. For example, the non-dimensional data object may be incomplete (i.e., a fragment, a corrupted version, etc.) version of the actual non-dimensional data. As such, a "guess" must be made to determine which dimension data should be associated with that corrupted non-dimensional data. In this example, assume that the corrupted non-dimensional data object contains the value "3.13", and that the data is related to areas of circles. If the value of the non-dimensional data object had been "3.14159", then there is a high probability (e.g., is predetermined to have a 99% probability) that this data object is the ratio of a circle's area divided by that circle's radius-squared (i.e., is "pi"). However, a predetermination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the conformed dimensional object. In one embodiment, this weighting factor is how "important" this particular conformed dimensional object is to an enterprise's project. For example, assume that an enterprise project is to track sales of a particular product at a particular store. If the conformed dimensional object contains information regarding how many units of this particular product have been sold at this store during a particular time period, then this conformed dimensional object is given (either manually or by an algorithm) an "importance" rating of 95 out of 100. However, if the conformed dimensional object describes whether the items are being paid for with cash or credit cards, such information is deemed less important (e.g., is given an "importance" rating of 30 out of 100). Note that an algorithm to determine (and/or predetermine) these importance ratings can utilize flags, metadata, etc. to determine the importance of the conformed dimensional objects. For example, assume that a particular conformed dimensional object has a flag indicating that it describes a quantity of products sold at a particular store on a particular day. Assume further that a software program for an enterprise project to track such products also has this flag. Thus, if the two flags match, then a high level of importance (e.g., over 95 on a scale of 100) is assigned to conformed dimensional objects that have this flag.

The parsed conformed dimensional objects 810 are then sent to the context-based conformed dimensional data gravity wells membrane 712, which is described above as depicted in FIG. 7.

FIG. 9 depicts a combination of parsed synthetic context-based and conformed dimensional objects (i.e., parsed objects 901) being selectively pulled into context-based conformed dimensional data gravity well frameworks in order to define context-based conformed dimensional data gravity wells. As described herein, these context-based conformed dimensional data gravity wells are capable of pulling in either synthetic context-based objects or conformed dimensional objects, which are defined and described above. Context-based conformed dimensional data gravity wells membrane 712 (depicted above in FIG. 7) supports multiple context-based conformed dimensional data gravity well frameworks. For example, consider context-based conformed dimensional data gravity well framework 902. A context-based conformed dimensional data gravity well framework is defined as a construct that includes the capability of pulling data objects from a streaming data flow, such as parsed objects 901, and storing same if a particular parsed object from parsed objects 901 contains a particular dimension object 913a and/or a particular context object 912a and/or a particular non-contextual data object 904a. Note that parsed objects 901 include both synthetic context-based objects as well as conformed dimensional objects, both of which are described/defined above.

Note that context-based conformed dimensional data gravity well framework 902 is not yet populated with any parsed objects, and thus is not yet a context-based conformed dimensional data gravity well. However, context-based conformed dimensional data gravity well framework 906 is populated with parsed objects 908, which are synthetic context-based objects and/or conformed dimensional objects, and thus has been transformed into a context-based conformed dimensional data gravity well 910. This transformation occurred when context-based conformed dimensional data gravity well framework 906, which contains (i.e., logically includes and/or points to) a non-contextual data object 904b, a context object 912b, and a dimension object 913b, one or more of which is part of each of the captured parsed objects 908 was populated with one or more parsed objects. As stated above, each of the captured parsed objects 908 may be either a synthetic context-based object or a conformed dimensional object.

Note that parsed objects 901 are streaming in real-time from a data source across the context-based conformed dimensional data gravity wells membrane 712. If a particular parsed object is never pulled into any of the context-based conformed dimensional data gravity wells on the context-based conformed dimensional data gravity wells membrane 712, then that particular parsed object simply continues to stream to another destination, and does not affect the size and/or location of any of the context-based conformed dimensional data gravity wells.

Consider now context-based conformed dimensional data gravity well 916. Note that context-based conformed dimensional data gravity well 916 includes two dimension objects 913c-913d as well as two context objects 912c-912d and a non-contextual data object 904c. The presence of dimension objects 913c-913d and context objects 912c-912d (which in one embodiment are graphically depicted on the walls of the context-based conformed dimensional data gravity well 916) causes objects such as parsed object 914b (which in one embodiment contains both dimension objects 913c and 913d and/or both context objects 912c-912d and/or non-contextual data object 904c) to be pulled into context-based conformed dimensional data gravity well 916. Note further that context-based conformed dimensional data gravity well 916 is depicted as being larger than context-based conformed dimensional data gravity well 910 or context-based conformed dimensional data gravity well 920, since there are more objects (918) in context-based conformed dimensional data gravity well 916 than there are in these other context-based conformed dimensional data gravity wells. That is, it is the quantity of objects that have been pulled into a particular context-based conformed dimensional data gravity well that determines the size and shape of that particular context-based conformed dimensional data gravity well. The fact that context-based conformed dimensional data gravity well 916 has two dimension objects 912c-912d and two context objects 912c-912d, while context-based conformed dimensional data gravity wells 910/920 have only one dimension object 913b/913e and one context object 912b/912e, has no bearing on the size of the context-based conformed dimensional data gravity wells 910/920. Rather, the size and shape of the context-based conformed dimensional data gravity wells 910/916/920 in this embodiment is based solely on the quantity of parsed objects that are pulled in.

Note that, in one embodiment, the context-based conformed dimensional data gravity wells depicted in FIG. 9 can be viewed as context-based dimensional relationship density wells. That is, the context-based conformed dimensional data gravity wells have a certain density of objects, which is due to a combination of how many objects have been pulled into a particular well as well as the weighting assigned to the objects, as described herein.

In one embodiment, the context-based conformed dimensional data gravity well frameworks and/or context-based conformed dimensional data gravity wells described in FIG. 9 are graphical representations of 1) sorting logic and 2) data storage logic that is part of CBCDDGWL 148 shown in FIG. 1. That is, the context-based conformed dimensional data gravity well frameworks define the criteria that are used to pull a particular parsed object into a particular context-based conformed dimensional data gravity well, while the context-based conformed dimensional data gravity wells depict the quantity of parsed objects that have been pulled into a particular context-based conformed dimensional data gravity well. Note that in one embodiment, the original object from the stream of parsed objects 901 goes into an appropriate context-based conformed dimensional data gravity well, with no copy of the original being made. In another embodiment, a copy of the original object from the stream of parsed objects 901 goes into an appropriate context-based conformed dimensional data gravity well, while the original object continues to its original destination (e.g., a server that keeps a database of inventory of items at a particular store). In another embodiment, the original object from the stream of parsed objects 901 goes into an appropriate context-based conformed dimensional data gravity well, while the copy of the original object continues to its original destination (e.g., a server that keeps a database of inventory of items at a particular store).

Figure 10:
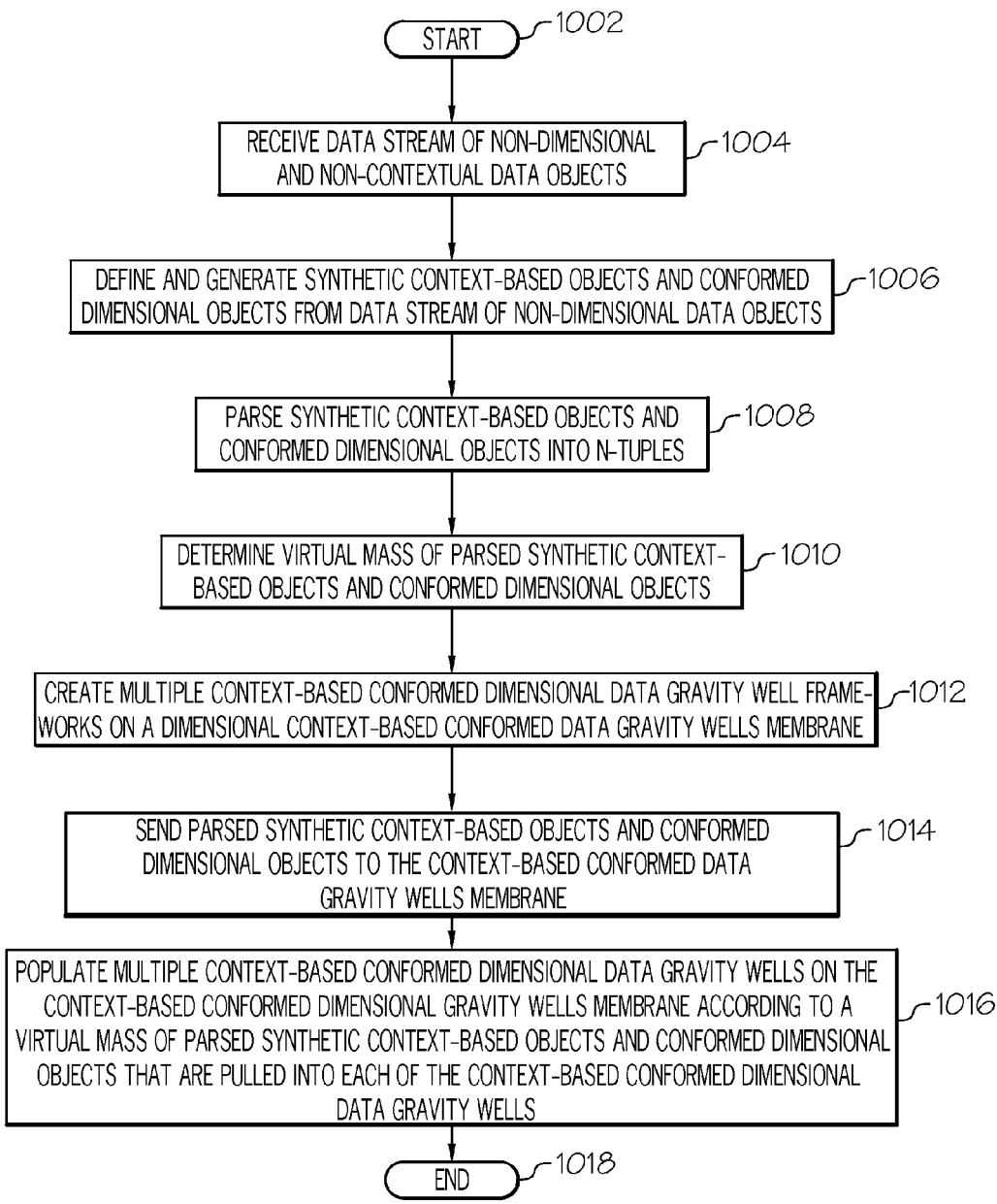
FIG. 10 is a high-level flow chart of one or more steps performed by a processor to define multiple context-based conformed dimensional data gravity wells on a context-based conformed dimensional data gravity wells membrane.

With reference now to FIG. 10, a high-level flow chart of one or more steps performed by a processor to define multiple context-based conformed dimensional data gravity wells on a context-based conformed dimensional data gravity wells membrane is presented. After initiator block 1002, a data stream (e.g., element 702 in FIG. 7 or element 802 in FIG. 8) of non-dimensional data objects and non-contextual data objects is received by a processor (block 1004). As described herein, each of the non-dimensional data objects describes an alphanumeric value that is dimensionless, and thus does not by itself describe a quantity of an item, or in some embodiments, even the item itself. Similarly, each of the non-contextual data objects ambiguously relates to multiple subject-matters. As described in block 1006, the processor then applies a dimension object to each of the non-dimensional data objects, in order to define and generate conformed dimensional objects from the data stream of non-dimensional data objects, and the processor associates each of the non-contextual data objects with one or more context objects, in order to define a synthetic context-based object. As described herein (e.g., see FIG. 2 above), the context object provides a context that identifies a specific subject-matter, from the multiple subject-matters, for the non-contextual data objects. As described above in FIG. 6, the dimension object provides a dimension that provides a meaningful dimension to each of the non-dimensional data objects.

As depicted in block 1008, the processor parses each of the streaming objects into an n-tuple. For the conformed dimensional objects, each n-tuple comprises a pointer to one of the non-dimensional data objects, a probability that a non-dimensional data object has been associated with a correct dimension object, and a weighting factor of importance of the conformed dimensional object. For the synthetic context-based objects, each n-tuple comprises a pointer to one of the non-contextual data objects, a probability that a non-contextual data object has been associated with a correct context object, and a weighting factor of importance of the synthetic context-based object. In one embodiment, the n-tuple also includes a probability that a particular object is uncorrupted. For example, if it is determined that a particular object is a fragment of an original object (e.g., by comparing the length, format, and other features of that object with known lengths, formats, and other features of data/objects coming from the same data/object source as that particular object), then a probability can be assessed as to whether that particular object is corrupted. For example, if a particular data object from "Source A" is 32 characters long, while a typical (e.g., 90% of the data objects from Source A) data object from Source A is 30 characters long, then it is likely (e.g., 80% probable) that this particular data object has been corrupted with additional data. Similarly, if a particular data object from Source A is 22 characters long, while a typical (e.g., 99% of the data objects from Source A) data object from Source A is 30 characters long, then it is likely (e.g., 99% probable) that this particular data object has been corrupted by having certain bits truncated/removed.

With respect to block 1010, the processor calculates a virtual mass of each of the parsed objects. In one embodiment, the virtual mass of the parsed object is derived by calculating the virtual mass of a parsed synthetic context-based object by using the formula $P_c(C) \times Wt_d(S)$, where $P_c(C)$ is the probability that the non-contextual data object has been associated with the correct context object, and where $Wt_d(S)$ is the weighting factor of importance of the synthetic context-based object; and by calculating the virtual mass of a parsed conformed dimensional object by using the formula $P_d(C) \times Wt_d(S)$, where $P_d(C)$ is the probability that 1) said one of the non-dimensional data objects has been associated with the correct dimensional label, 2) said one of the non-dimensional data objects is uncorrupted, and 3) said one of the non-dimensional data objects has come from a data source whose data has been predetermined to be appropriate for storage in a particular context-based conformed dimensional data gravity well; and where $Wt_d(S)$ is the weighting factor of importance of the conformed dimensional object. The probabilities of 1) and 2) occurring are discussed above. The probability of 3) occurring can be predetermined by assigning one or more flags or other markers to each of the context-based conformed dimensional data gravity wells. For example, assume that these flags/markers identify five characteristics (e.g., length of the data, format of the data, time/date of when the data is generated, how frequently identical data is generated, and a source type (e.g., point of sales stations, stored databases, websites, etc.) of the data) of data that will be accepted in a particular context-based conformed dimensional data gravity well. If a certain non-dimensional data object has four of these flags/markers (e.g., as part of its n-tuple), then there may be a 90% probability that this non-dimensional data object is appropriate for storage within the particular context-based conformed dimensional data gravity well that has the five flags/markers. However, if a certain non-dimensional data object has only three of these flags/markers (e.g., as part of its n-tuple), then there may be only a 50% probability that this non-dimensional data object is appropriate for storage within that same particular context-based conformed dimensional data gravity well.

Continuing with the overall formula P(C)×Wt(S), Wt(S) is the weighting factor of importance of the conformed dimensional object. As described herein, in one embodiment the weighting factor of importance of the conformed dimensional object is based on how important the conformed dimensional object is to a particular project.

As described in block 1012, the processor creates multiple context-based conformed dimensional data gravity well frameworks on a context-based conformed dimensional data gravity wells membrane. Each of the multiple context-based conformed dimensional data gravity well frameworks comprises at least one dimension object, at least one non-contextual data object, and at least one context object. As described herein, the context-based conformed dimensional data gravity wells membrane is a virtual mathematical membrane that is capable of supporting multiple context-based conformed dimensional data gravity wells.

As described in block 1014, multiple parsed objects are then transmitted to the context-based conformed dimensional data gravity wells membrane. That is, these parsed objects are then transmitted to an algorithmic environment in which the logic-enabled context-based conformed dimensional data gravity well frameworks exist. These context-based conformed dimensional data gravity well frameworks are algorithmically generated based on their ability to attract specific objects. As described in block 1016, this pulling/attraction enables the processor to define multiple context-based conformed dimensional data gravity wells according to the virtual mass of multiple parsed objects that are pulled into each of the context-based conformed dimensional data gravity well frameworks. As described herein, each of the multiple parsed objects is pulled into a particular context-based conformed dimensional data gravity well in response to values from its n-tuple matching at least one dimensional object, at least one non-contextual data object, at least one context object, and/or other probability factors described herein, that is part of the particular context-based conformed dimensional data gravity well.

In one embodiment, the generated context-based conformed dimensional data gravity wells are presented on a display according to a combined virtual mass of the multiple parsed objects that populate each context-based conformed dimensional data gravity well. That is, a first context-based conformed dimensional data gravity well that holds a more virtually massive combination of parsed objects than a second context-based conformed dimensional data gravity well will be larger, and thus is visually depicted on a display as extending farther away from the context-based conformed dimensional data gravity wells membrane than the second context-based conformed dimensional data gravity well.

In one embodiment, the construction of the context-based conformed dimensional data gravity wells is temporally dynamic. That is, in this embodiment, the processor determines an age (i.e., how "stale" or "old") each of the multiple parsed objects that have been pulled into the particular context-based conformed dimensional data gravity well is. Based on the age of each of these objects, the processor removes, from the particular context-based conformed dimensional data gravity well that holds a stale object, any parsed object that is older than a predetermined age.

In one embodiment, a likelihood that a particular object is pulled into an appropriate context-based conformed dimensional data gravity well is performed using a Bayesian probability formula. That is, an appropriate context-based conformed dimensional data gravity well is defined as a context-based conformed dimensional data gravity well whose framework includes at least one non-contextual data object, at least one context object, and/or at least one dimension object found in a parsed object that is pulled into that particular (appropriate) context-based conformed dimensional data gravity well.

For example, in order to determine a likelihood that a particular object is pulled into an appropriate context-based conformed dimensional data gravity well, assume that A represents the event that a particular object is a good populator of a particular context-based conformed dimensional data gravity well, and B represents the event that the particular object has a predefined amount of conformed dimension/context objects applied to its data object. This results in the Bayesian probability formula of:

$$P(A \mid B) = \frac{P(B \mid A)P(A)}{P(B)}$$

where:
P(A|B) is the probability that a particular data object will be an appropriate populator of a particular context-based conformed dimensional data gravity well (A) given that (|) a predefined amount of conformed dimension/context objects are applied to the data object in a context-based or conformed dimensional object (B);
P(B|A) is the probability that the predefined amount of context-based or conformed dimensional objects are applied to the data object in the context-based or conformed dimensional object (B) given that (|) the data object is assigned to the particular context-based conformed dimensional data gravity well (A);
P(A) is the probability that the particular object will be the appropriate populator of the particular context-based conformed dimensional data gravity well regardless of any other information; and
P(B) is the probability that the particular object will have the predefined amount of conformed context/dimension objects regardless of any other information.

For example, assume that nine out of ten of the data objects that populate a particular context-based conformed dimensional data gravity well have the predefined amount (e.g., 80%) of the context/dimension objects that are on the sides of the particular context-based conformed dimensional data gravity well. Thus, P(B|A)=9/10=0.90. Assume also that the odds that any data object will be an appropriate populator of a particular context-based conformed dimensional data gravity well, regardless of any other information (P(A)), is 0.20, and that the probability that any data object will have the predefined amount of conformed context/dimension objects regardless of any other information (P(B)) is 0.25. The probability that any one data object will be a good populator of a particular context-based conformed dimensional data gravity well (based on these parameters) is 72%:

$$P(A \mid B) = \frac{.90 * .20}{.25} = .72$$

However, if nine out of ten of the conformed dimensional objects that populate a particular context-based conformed dimensional data gravity well still have the predefined amount (e.g., 80%) of the context/dimension objects that are on the sides of the particular context-based conformed dimensional data gravity well (P(B|A)=9/10=0.90), but now the odds that any data object will be an appropriate populator of a particular context-based conformed dimensional data gravity well, regardless of any other information (P(A)), is 25%, and the probability that any data object will have the predefined amount of conformed context/dimension objects regardless of any other information (P(B)) is now 23%, then the probability that any one data object will be a good populator of a particular context-based conformed dimensional data gravity well (based on these new parameters) is 98%:

$$P(A \mid B) = \frac{.90 * .25}{.23} = .98$$

The process depicted in FIG. 10 ends at terminator block 1018.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of defining multiple context-based conformed dimensional data gravity wells on a context-based conformed dimensional data gravity wells membrane, the processor-implemented method comprising:

receiving, by a processor, a data stream of non-contextual data objects, wherein each of the non-contextual data objects is a numerical value that ambiguously relates to multiple subject-matters;

associating, by the processor, one of the non-contextual data objects with a context object to define a synthetic context-based object, wherein the context object provides a context that identifies a specific subject-matter, from the multiple subject-matters, of said one of the non-contextual data objects;

receiving, by the processor, a data stream of non-dimensional data objects;

applying, by the processor, a dimension object to one of the non-dimensional data objects to define a conformed dimensional object;

parsing, by the processor, the conformed dimensional object into a dimensional n-tuple, wherein the dimensional n-tuple comprises a pointer to one of the non-dimensional data objects and a probability that one of the non-dimensional data objects has been associated with a correct dimensional label;

parsing, by the processor, the synthetic context-based object into a context-based n-tuple, wherein the context-based n-tuple comprises a pointer to one of the non-contextual data objects and a probability that a non-contextual data object has been associated with a correct context object;

calculating, by the processor, a virtual mass of a parsed synthetic context-based object based on a probability that the non-contextual data object has been associated with a correct context object;

calculating, by the processor, a virtual mass of a parsed conformed dimensional object based on a probability that one of the non-dimensional data objects has come from a data source whose data has been predetermined to be appropriate for storage in a particular dimensional data gravity well;

creating, by the processor, multiple context-based conformed dimensional data gravity well frameworks on a context-based conformed dimensional data gravity wells membrane, wherein each of the multiple context-based conformed dimensional data gravity well frameworks comprises at least one non-contextual data object, at least one context object, and at least one dimension object, and wherein the context-based conformed dimensional data gravity wells membrane is a virtual mathematical membrane that is capable of supporting multiple context-based conformed dimensional data gravity wells;

transmitting, by the processor, multiple parsed synthetic context-based objects and multiple parsed conformed dimensional objects to the context-based conformed dimensional data gravity wells membrane; and defining, by the processor, multiple context-based conformed dimensional data gravity wells according to the virtual mass of multiple parsed synthetic context-based objects and the virtual mass of multiple parsed conformed dimensional objects that are pulled into each of the context-based conformed dimensional data gravity well frameworks, wherein each of the multiple parsed synthetic context-based objects and multiple parsed conformed dimensional objects is pulled into a particular context-based conformed dimensional data gravity well in response to values from its n-tuple matching said at least one context object or said at least one dimension object in said particular context-based conformed dimensional data gravity well.

2. The processor-implemented method of claim 1, further comprising:

graphically displaying the multiple context-based conformed dimensional data gravity wells according to a combined virtual mass of the multiple parsed synthetic context-based objects and the multiple parsed conformed dimensional objects, wherein a first context-based conformed dimensional data gravity well holds a more virtually massive combination of parsed data objects than a second context-based conformed dimensional data gravity well, and wherein the first context-based conformed dimensional data gravity well extends farther away from the context-based conformed dimensional data gravity wells membrane than the second context-based conformed dimensional data gravity well.

3. The processor-implemented method of claim 1, wherein a particular data object is either a conformed dimensional object or a synthetic context-based object, the processor-implemented method further comprising:

determining, by the processor, a likelihood that the particular data object is pulled into an appropriate context-based conformed dimensional data gravity well according to a Bayesian probability formula of:

$$P(A \mid B) = \frac{P(B \mid A)P(A)}{P(B)}$$

where:

P(A|B) is the probability that a particular data object will be an appropriate populator of a particular context-based conformed dimensional data gravity well (A) given that (|) a predefined amount of conformed dimensional objects are applied to a data object in a conformed dimensional object or a predefined amount of context objects are applied to a data object in a synthetic context-based object (B);

P(B|A) is a probability that a predefined amount of context-based or conformed dimensional objects are applied to the data object in the context-based or conformed dimensional object (B) given that (|) the data object is assigned to the particular context-based conformed dimensional data gravity well (A);

P(A) is a probability that the particular object will be the appropriate populator of the particular context-based conformed dimensional data gravity well regardless of any other information; and P(B) is a probability that the particular object will have the predefined amount of context-based or conformed dimensional objects regardless of any other information.

4. The processor-implemented method of claim 1, further comprising:

determining that said one of the non-dimensional data objects is uncorrupted by determining that said one of the non-dimensional data objects is not a fragment of an original data object.

5. The processor-implemented method of claim 1, further comprising:

graphically representing, by the processor, said at least one dimension object and said at least one context object on a wall of said particular context-based conformed dimensional data gravity well.

6. The processor-implemented method of claim 1, further comprising:

determining, by the processor, an age of each data that has been pulled into the particular context-based conformed dimensional data gravity well; and removing from the particular context-based conformed dimensional data gravity well any data object that is older than a predetermined age.

7. A computer program product for defining multiple context-based conformed dimensional data gravity wells on a context-based conformed dimensional data gravity wells membrane, the computer program product comprising a non-transitory computer readable storage medium having program code embodied therewith, the program code readable and executable by a processor to perform a method comprising:

receiving a data stream of non-contextual data objects, wherein each of the non-contextual data objects ambiguously relates to multiple subject-matters;

associating one of the non-contextual data objects with a context object to define a synthetic context-based object, wherein the context object provides a context that identifies a specific subject-matter, from the multiple subject-matters, of said one of the non-contextual data objects;

receiving a data stream of non-dimensional data objects;

applying a dimension object to one of the non-dimensional data objects to define a conformed dimensional object;

parsing the conformed dimensional object into a dimensional n-tuple, wherein the dimensional n-tuple comprises a pointer to one of the non-dimensional data objects, a probability that one of the non-dimensional data objects is uncorrupted, and a weighting factor of importance of the conformed dimensional object;

parsing the synthetic context-based object into a context-based n-tuple, wherein the context-based n-tuple comprises a pointer to one of the non-contextual data objects, a probability that a non-contextual data object has been associated with a correct context object, and a weighting factor of importance of the synthetic context-based object;

calculating a virtual mass of a parsed synthetic context-based object based on a probability that the non-contextual data object has been associated with a correct context object;

calculating a virtual mass of a parsed conformed dimensional object based on a probability that one of the non-dimensional data objects has come from a data source whose data has been predetermined to be appropriate for storage in a particular dimensional data gravity well;

creating multiple context-based conformed dimensional data gravity well frameworks on a context-based conformed dimensional data gravity wells membrane, wherein each of the multiple context-based conformed dimensional data gravity well frameworks comprises at least one non-contextual data object, at least one context object, and at least one dimension object, and wherein the context-based conformed dimensional data gravity wells membrane is a virtual mathematical membrane that is capable of supporting multiple context-based conformed dimensional data gravity wells;

transmitting multiple parsed synthetic context-based objects and multiple parsed conformed dimensional objects to the context-based conformed dimensional data gravity wells membrane; and defining multiple context-based conformed dimensional data gravity wells according to the virtual mass of multiple parsed synthetic context-based objects and the virtual mass of multiple parsed conformed dimensional objects that are pulled into each of the context-based conformed dimensional data gravity well frameworks, wherein each of the multiple parsed synthetic context-based objects and multiple parsed conformed dimensional objects is pulled into a particular context-based conformed dimensional data gravity well in response to values from its n-tuple matching said at least one context object or said at least one dimension object in said particular context-based conformed dimensional data gravity well.

8. The computer program product of claim 7, further comprising program code that is readable and executable by the processor to:

graphically display the multiple context-based conformed dimensional data gravity wells according to a combined virtual mass of the multiple parsed synthetic context-based objects and the multiple parsed conformed dimensional objects, wherein a first context-based conformed dimensional data gravity well holds a more virtually massive combination of parsed data objects than a second context-based conformed dimensional data gravity well, and wherein the first context-based conformed dimensional data gravity well extends farther away from the context-based conformed dimensional data gravity wells membrane than the second context-based conformed dimensional data gravity well.

9. The computer program product of claim 7, wherein a particular data object is either a conformed dimensional object or a synthetic context-based object, and wherein the computer program product further comprises program code that is readable and executable by the processor to:

determine a likelihood that a particular data object is pulled into an appropriate context-based conformed dimensional data gravity well according to a Bayesian probability formula of:

$$P(A\mid B) = \frac{P(B\mid A)P(A)}{P(B)}$$

where:

P(A|B) is the probability that a particular data object will be an appropriate populator of a particular context-based conformed dimensional data gravity well (A) given that (|) a predefined amount of conformed dimensional objects are applied to a data object in a conformed dimensional object or a predefined amount of context objects are applied to a data object in a synthetic context-based object (B);

P(B|A) is a probability that a predefined amount of context-based or conformed dimensional objects are applied to the data object in the context-based or conformed dimensional object (B) given that (|) the data object is assigned to the particular context-based conformed dimensional data gravity well (A);

P(A) is a probability that the particular object will be the appropriate populator of the particular context-based conformed dimensional data gravity well regardless of any other information; and P(B) is a probability that the particular object will have the predefined amount of context-based or conformed dimensional objects regardless of any other information.

10. The computer program product of claim 7, wherein the weighting factor of importance of a data object is based on how important the data object is to a particular project.

11. The computer program product of claim 7, further comprising program code that is readable and executable by the processor to:

determine that said one of the non-dimensional data objects is uncorrupted by determining that said one of the non-dimensional data objects is not a fragment of an original data object.

12. The computer program product of claim 7, further comprising program code that is readable and executable by the processor to:

graphically represent said at least one dimension object and said at least one context object on a wall of said particular context-based conformed dimensional data gravity well.

13. The computer program product of claim 7, further comprising program code that is readable and executable by the processor to:

determine an age of each data that has been pulled into the particular context-based conformed dimensional data gravity well; and remove from the particular context-based conformed dimensional data gravity well any data object that is older than a predetermined age.

14. A computer system comprising:

a processor, a computer readable memory, and a non-transitory computer readable storage medium;

first program instructions to receive a data stream of non-contextual data objects, wherein each of the non-contextual data objects ambiguously relates to multiple subject-matters;

second program instructions to associate one of the non-contextual data objects with a context object to define a synthetic context-based object, wherein the context object provides a context that identifies a specific subject-matter, from the multiple subject-matters, of said one of the non-contextual data objects;

third program instructions to receive a data stream of non-dimensional data objects;

fourth program instructions to apply a dimension object to one of the non-dimensional data objects to define a conformed dimensional object;

fifth program instructions to parse the conformed dimensional object into a dimensional n-tuple, wherein the dimensional n-tuple comprises a pointer to one of the non-dimensional data objects and a probability that one of the non-dimensional data objects is uncorrupted;

sixth program instructions to parse the synthetic context-based object into a context-based n-tuple, wherein the context-based n-tuple comprises a pointer to one of the non-dimensional data objects and a probability that one of the non-dimensional data objects is uncorrupted;

seventh program instructions to calculate a virtual mass of a parsed synthetic context-based object based on a probability that the non-contextual data object has been associated with a correct context object;

eighth program instructions to calculate a virtual mass of a parsed conformed dimensional object based on a probability that one of the non-dimensional data objects has come from a data source whose data has been predetermined to be appropriate for storage in a particular dimensional data gravity well;

ninth program instructions to create multiple context-based conformed dimensional data gravity well frameworks on a context-based conformed dimensional data gravity wells membrane, wherein each of the multiple context-based conformed dimensional data gravity well frameworks comprises at least one non-contextual data object, at least one context object, and at least one dimension object, and wherein the context-based conformed dimensional data gravity wells membrane is a virtual mathematical membrane that is capable of supporting multiple context-based conformed dimensional data gravity wells;

tenth program instructions to transmit multiple parsed synthetic context-based objects and multiple parsed conformed dimensional objects to the context-based conformed dimensional data gravity wells membrane; and eleventh program instructions to define multiple context-based conformed dimensional data gravity wells according to the virtual mass of multiple parsed synthetic context-based objects and the virtual mass of multiple parsed conformed dimensional objects that are pulled into each of the context-based conformed dimensional data gravity well frameworks, wherein each of the multiple parsed synthetic context-based objects and multiple parsed conformed dimensional objects is pulled into a particular context-based conformed dimensional data gravity well in response to values from its n-tuple matching said at least one context object or said at least one dimension object in said particular context-based conformed dimensional data gravity well; and wherein the first, second, third, fourth, fifth, sixth, seventh, eighth, ninth, tenth, and eleventh program instructions are stored on the non-transitory computer readable storage medium for execution by the processor via the computer readable memory.

15. The computer system of claim 14, further comprising:
twelfth program instructions to graphically display the multiple context-based conformed dimensional data gravity wells according to a combined virtual mass of the multiple parsed synthetic context-based objects and the multiple parsed conformed dimensional objects, wherein a first context-based conformed dimensional data gravity well holds a more virtually massive combination of parsed data objects than a second context-based conformed dimensional data gravity well, and wherein the first context-based conformed dimensional data gravity well extends farther away from the context-based conformed dimensional data gravity wells membrane than the second context-based conformed dimensional data gravity well; and wherein the twelfth program instructions are stored on the non-transitory computer readable storage medium for execution by the processor via the computer readable memory.

16. The computer system of claim 14, wherein a particular data object is either a conformed dimensional object or a synthetic context-based object, and wherein the computer system further comprises:
twelfth program instructions to determine a likelihood that a particular data object is pulled into an appropriate context-based conformed dimensional data gravity well according to a Bayesian probability formula of:

$$P(A \mid B) = \frac{P(B \mid A)P(A)}{P(B)}$$

where:
$P(A|B)$ is the probability that a particular data object will be an appropriate populator of a particular context-based conformed dimensional data gravity well (A) given that (|) a predefined amount of conformed dimensional objects are applied to a data object in a conformed dimensional object or a predefined amount of context objects are applied to a data object in a synthetic context-based object (B);
$P(B|A)$ is a probability that a predefined amount of context-based or conformed dimensional objects are applied to the data object in the context-based or conformed dimensional object (B) given that (|) the data object is assigned to the particular context-based conformed dimensional data gravity well (A);
$P(A)$ is a probability that the particular object will be the appropriate populator of the particular context-based conformed dimensional data gravity well regardless of any other information; and
$P(B)$ is a probability that the particular object will have the predefined amount of context-based or conformed dimensional objects regardless of any other information; and wherein the twelfth program instructions are stored on the non-transitory computer readable storage medium for execution by the processor via the computer readable memory.

17. The computer system of claim 14, wherein the weighting factor of importance of a data object is based on how important the data object is to a particular project.

18. The computer system of claim 14, further comprising:
twelfth program instructions to determine that said one of the non-dimensional data objects is uncorrupted by determining that said one of the non-dimensional data objects is not a fragment of an original data object; and wherein
the twelfth program instructions are stored on the non-transitory computer readable storage medium for execution by the processor via the computer readable memory.

19. The computer system of claim 14, further comprising:
twelfth program instructions to determine an age of each data that has been pulled into the particular context-based conformed dimensional data gravity well; and
thirteenth program instructions to remove from the particular context-based conformed dimensional data gravity well any data object that is older than a predetermined age; and wherein the twelfth and thirteenth program instructions are stored on the non-transitory computer readable storage medium for execution by the processor via the computer readable memory.

\* \* \* \* \*